(12) United States Patent
Lee et al.

(10) Patent No.: US 10,008,881 B2
(45) Date of Patent: Jun. 26, 2018

(54) WIRELESS POWER RECEIVER WITH VARIABLE FREQUENCY AND METHOD OF CONTROLLING THE SAME

(71) Applicant: LG INNOTEK CO., LTD., Seoul (KR)

(72) Inventors: Jung Oh Lee, Seoul (KR); Ki Chul Chang, Seoul (KR); Ki Min Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 464 days.

(21) Appl. No.: 14/648,183

(22) PCT Filed: Nov. 5, 2013

(86) PCT No.: PCT/KR2013/009959
§ 371 (c)(1),
(2) Date: May 28, 2015

(87) PCT Pub. No.: WO2014/092339
PCT Pub. Date: Jun. 19, 2014

(65) Prior Publication Data
US 2015/0318710 A1      Nov. 5, 2015

(30) Foreign Application Priority Data

Dec. 13, 2012   (KR) .......................... 10-2012-0145814

(51) Int. Cl.
*H02J 5/00* (2016.01)
*H02J 50/10* (2016.01)
(Continued)

(52) U.S. Cl.
CPC .............. *H02J 50/10* (2016.02); *H02J 5/005* (2013.01); *H02J 7/025* (2013.01); *H02J 17/00* (2013.01);
(Continued)

(58) Field of Classification Search
CPC .. H02J 5/005; H02J 50/80; H02J 50/12; H02J 17/00; H04B 5/0093; H04B 5/0037
See application file for complete search history.

(56) References Cited

U.S. PATENT DOCUMENTS 6,118,249 A * 9/2000 Brockmann ............ H02J 7/025
                                                                  320/106
6,184,651 B1 * 2/2001 Fernandez .............. H02J 7/025
                                                                  320/108
(Continued)

FOREIGN PATENT DOCUMENTS

JP        10-145987 A      5/1998
JP        2009-205050 A    9/2009
(Continued)

OTHER PUBLICATIONS

Johns, "An introduction to the Wireless Power Consortium standard and Ti's compliant solutions," Analog Applications Journal, Mar. 31, 2011, XP007921031, pp. 10-12 (5 pages).

*Primary Examiner* — Jared Fureman
*Assistant Examiner* — Michael Warmflash
(74) *Attorney, Agent, or Firm* — Birch, Stewart, Kolasch & Birch, LLP

(57) ABSTRACT

A wireless power receiver to wirelessly receive power from a wireless power transmitter comprises a reception coil to receive the power wirelessly transmitted from the wireless power transmitter through a magnetic field, a frequency detecting unit to detect a frequency band of the power transmitted from the wireless power transmitter and an inductance varying unit to change an inductance of the reception coil according to the detected frequency band.

14 Claims, 7 Drawing Sheets

(51) Int. Cl.
  *H04B 5/00*   (2006.01)
  *H02J 17/00*  (2006.01)
  *H02J 7/02*   (2016.01)
  *H02J 50/12*  (2016.01)
  *H02J 50/80*  (2016.01)

(52) U.S. Cl.
  CPC .............. *H02J 50/12* (2016.02); *H02J 50/80* (2016.02); *H04B 5/0037* (2013.01); *H04B 5/0093* (2013.01)

(56) References Cited

U.S. PATENT DOCUMENTS

| | | | | |
|---|---|---|---|---|
| 8,842,410 | B2* | 9/2014 | Chan | H01F 21/12 |
| | | | | 307/37 |
| 8,928,275 | B2* | 1/2015 | Elo | H02J 5/005 |
| | | | | 307/104 |
| 9,509,374 | B2* | 11/2016 | Kim | H02J 7/025 |
| 2004/0130915 | A1 | 7/2004 | Baarman | |
| 2005/0068146 | A1* | 3/2005 | Jessie | H01F 17/0006 |
| | | | | 336/200 |
| 2009/0134949 | A1 | 5/2009 | He | |
| 2010/0052431 | A1 | 3/2010 | Mita | |
| 2010/0289449 | A1* | 11/2010 | Elo | H02J 5/005 |
| | | | | 320/108 |
| 2011/0121658 | A1 | 5/2011 | Fukada | |
| 2011/0270462 | A1 | 11/2011 | Amano et al. | |
| 2012/0112554 | A1* | 5/2012 | Kim | H02J 5/005 |
| | | | | 307/104 |
| 2012/0169133 | A1 | 7/2012 | Lisi et al. | |
| 2012/0235508 | A1 | 9/2012 | Ichikawa | |
| 2012/0235509 | A1 | 9/2012 | Ueno et al. | |
| 2012/0235636 | A1* | 9/2012 | Partovi | H02J 7/025 |
| | | | | 320/108 |
| 2012/0242161 | A1 | 9/2012 | Kudo et al. | |
| 2012/0244822 | A1 | 9/2012 | Kim et al. | |
| 2012/0267960 | A1 | 10/2012 | Low et al. | |
| 2013/0106197 | A1* | 5/2013 | Bae | H04B 5/0037 |
| | | | | 307/104 |
| 2014/0239732 | A1* | 8/2014 | Mach | H02J 5/00 |
| | | | | 307/104 |

FOREIGN PATENT DOCUMENTS

| | | |
|---|---|---|
| JP | 2010-063245 A | 3/2010 |
| JP | 2010-119246 A | 5/2010 |
| JP | 2012-100390 A | 5/2012 |
| JP | 2012-196031 A | 10/2012 |
| JP | 2012-200085 A | 10/2012 |
| JP | 2012-213324 A | 11/2012 |
| JP | 2014-509183 A | 4/2014 |
| KR | 10-2006-0058735 A | 5/2006 |
| KR | 10-2010-0097192 A | 9/2010 |
| KR | 10-1153179 B1 | 6/2012 |
| WO | WO 2009/144542 A1 | 12/2009 |
| WO | WO 2011/061821 A1 | 5/2011 |

* cited by examiner

[Fig. 1]
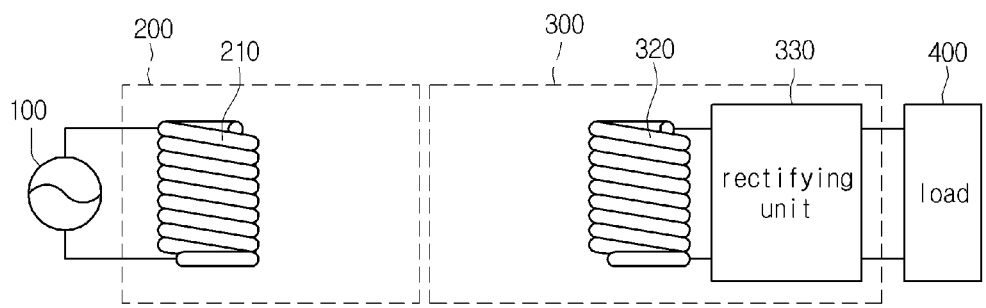
[Fig. 2]
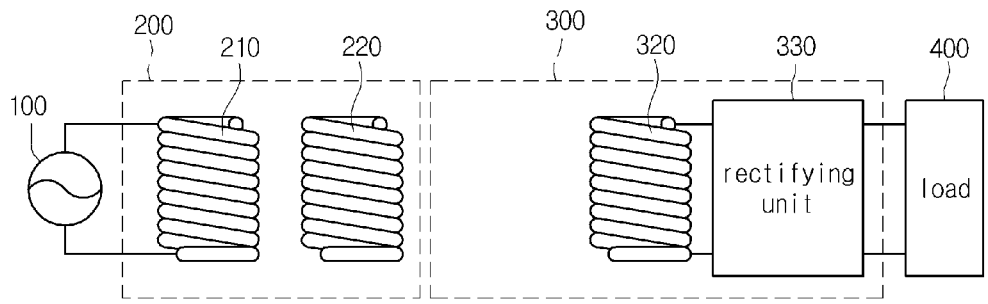
[Fig. 3]
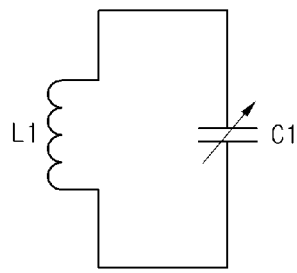
[Fig. 4]
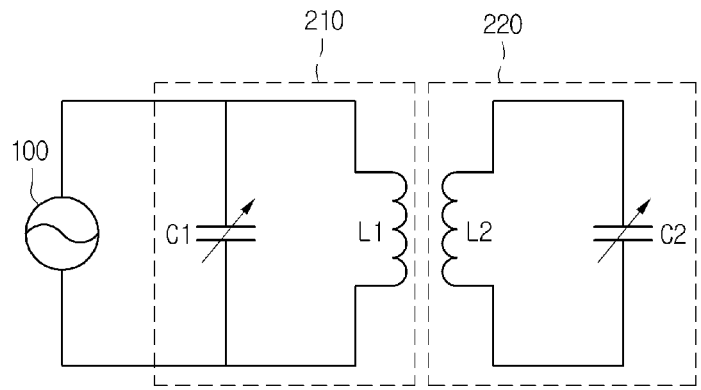

[Fig. 5]
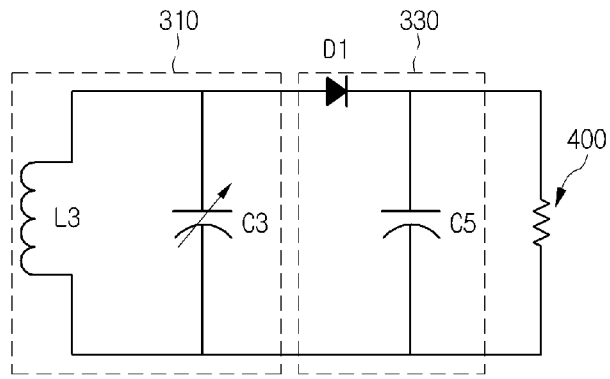
[Fig. 6]
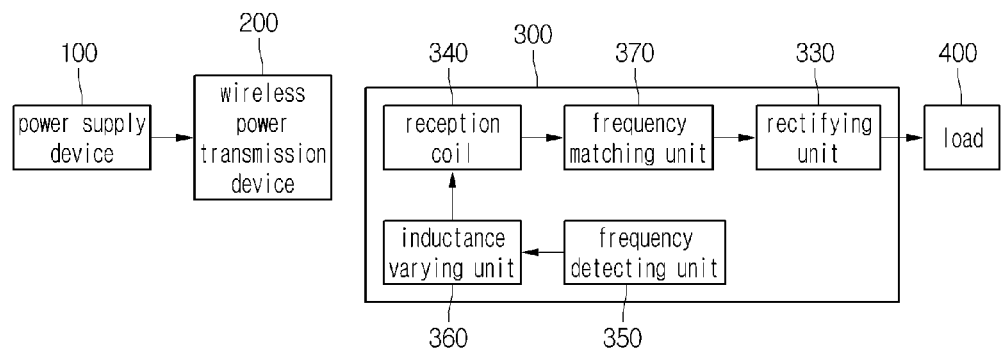
[Fig. 7]
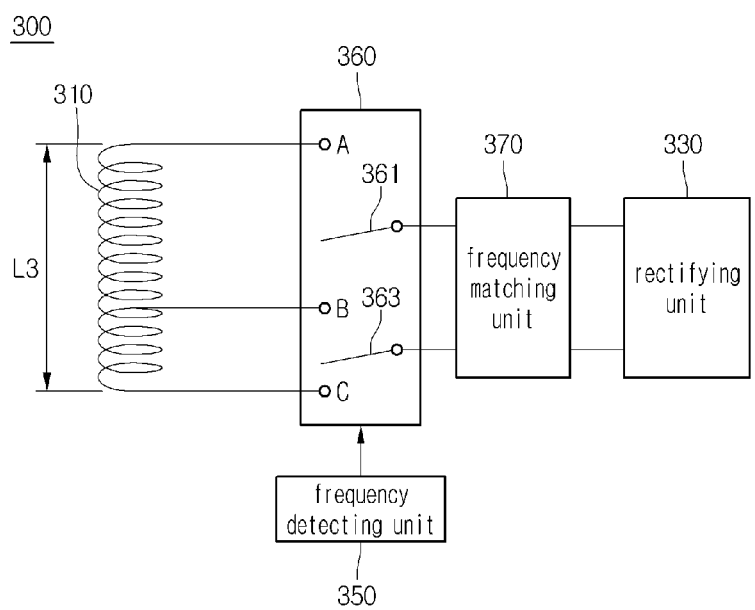

[Fig. 8]
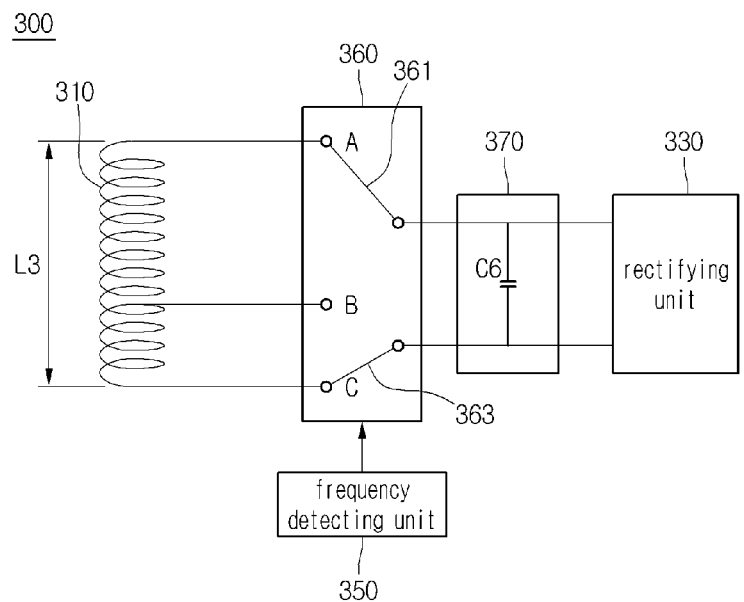
[Fig. 9]
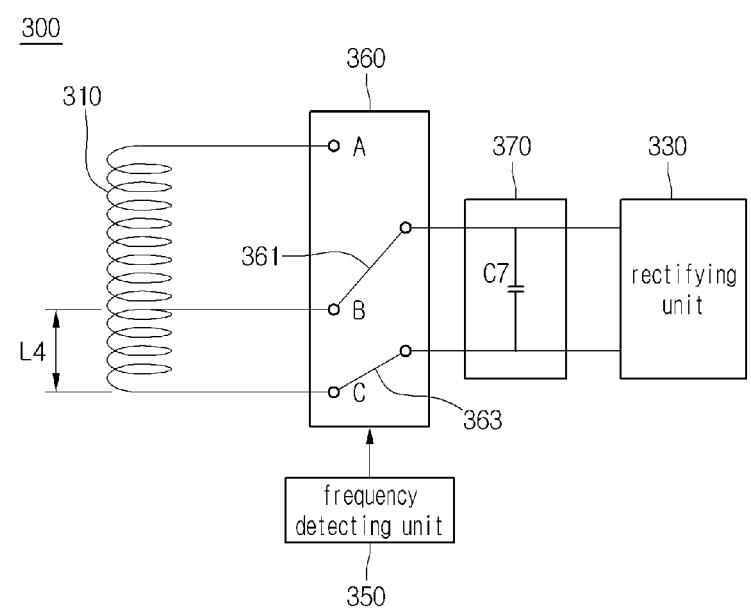

[Fig. 10]
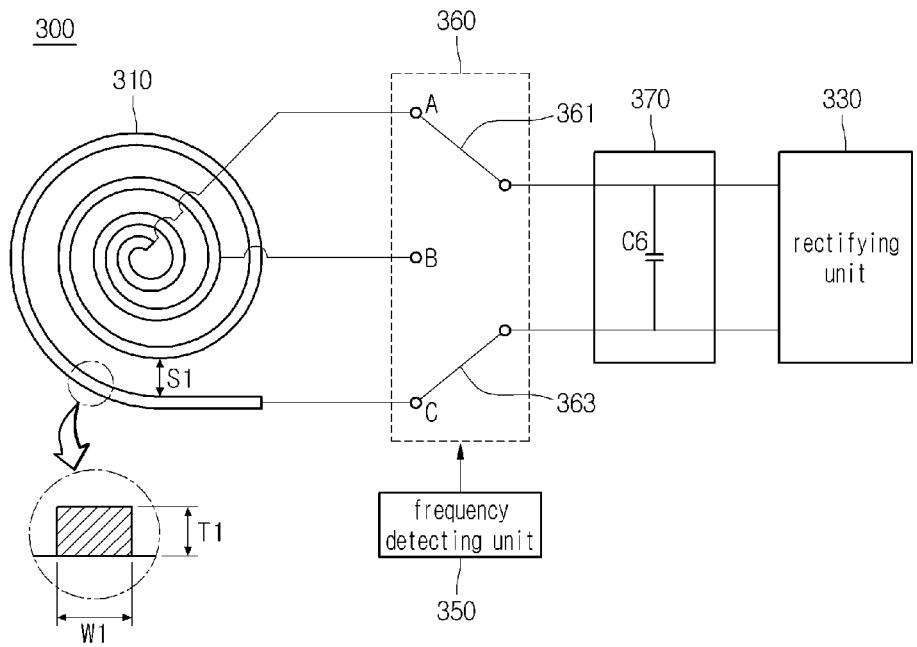
[Fig. 11]
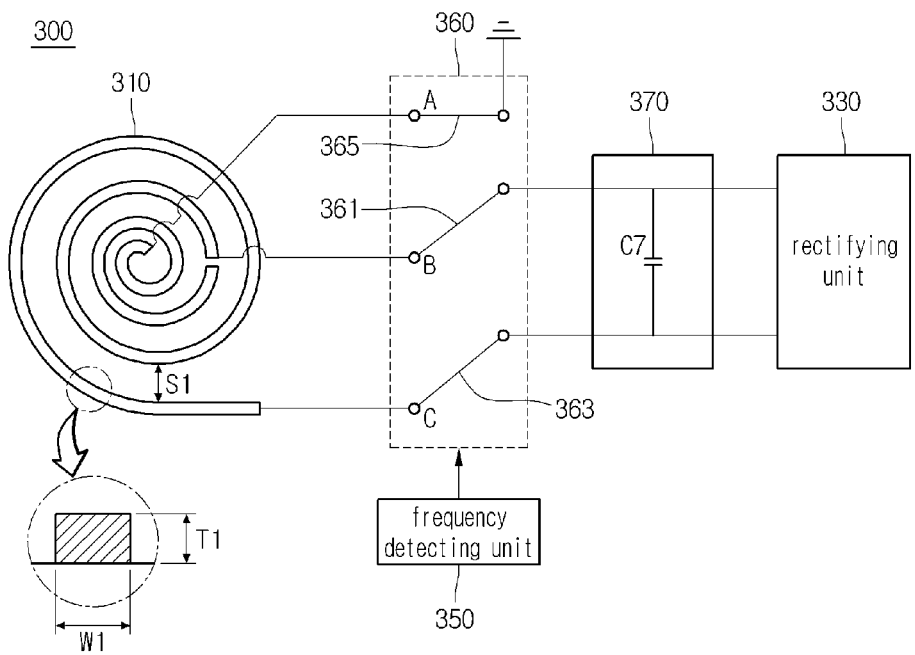

[Fig. 12]
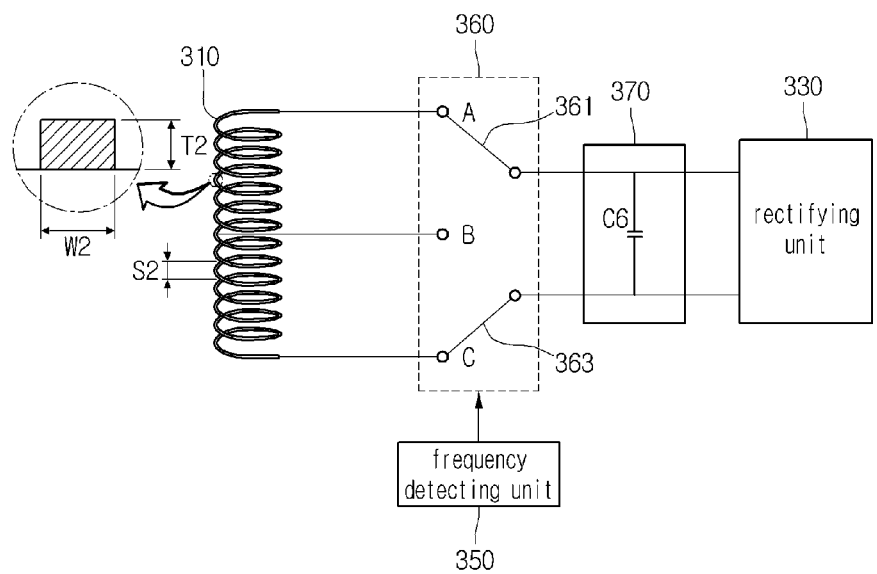
[Fig. 13]
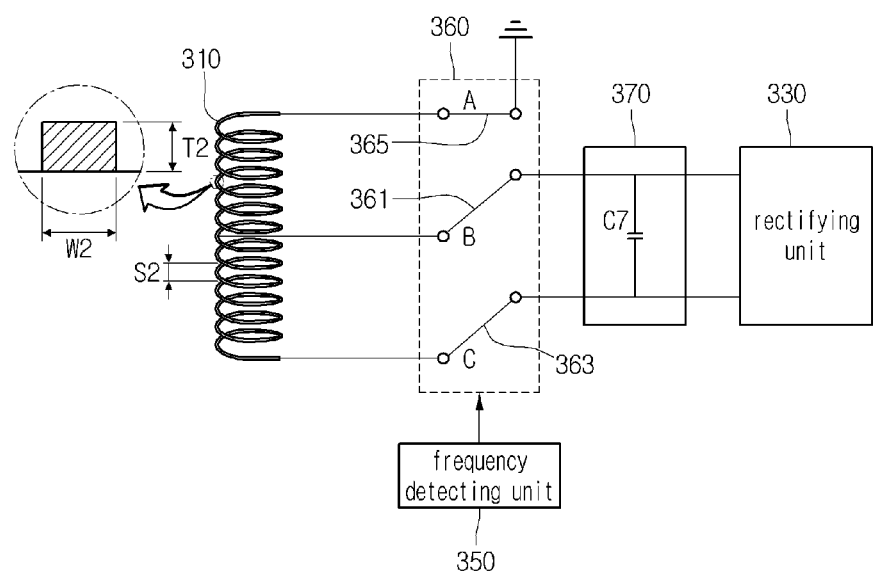

[Fig. 14]
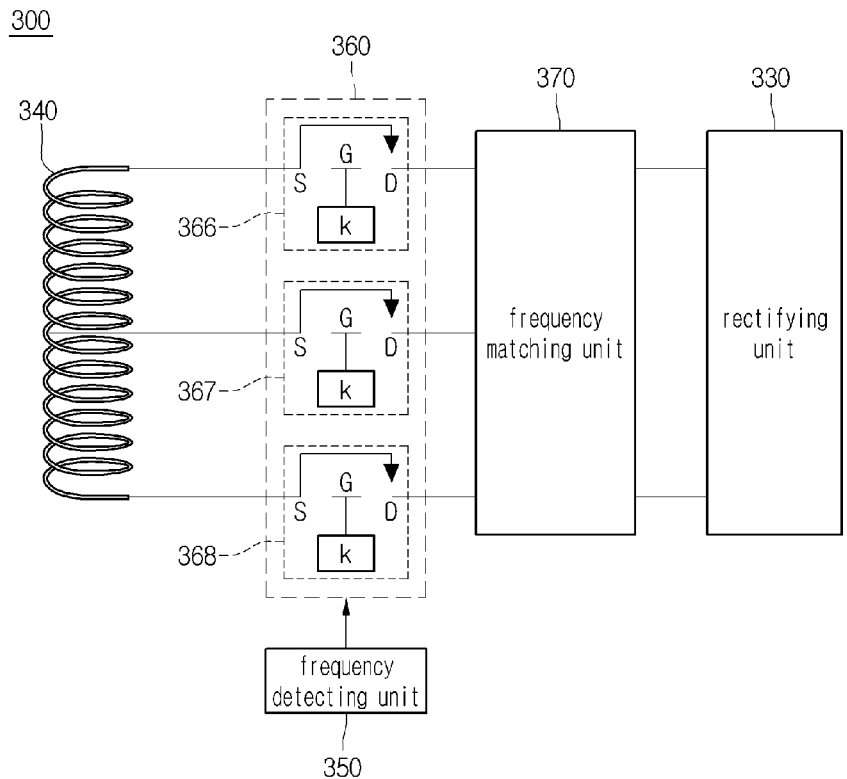
[Fig. 15]
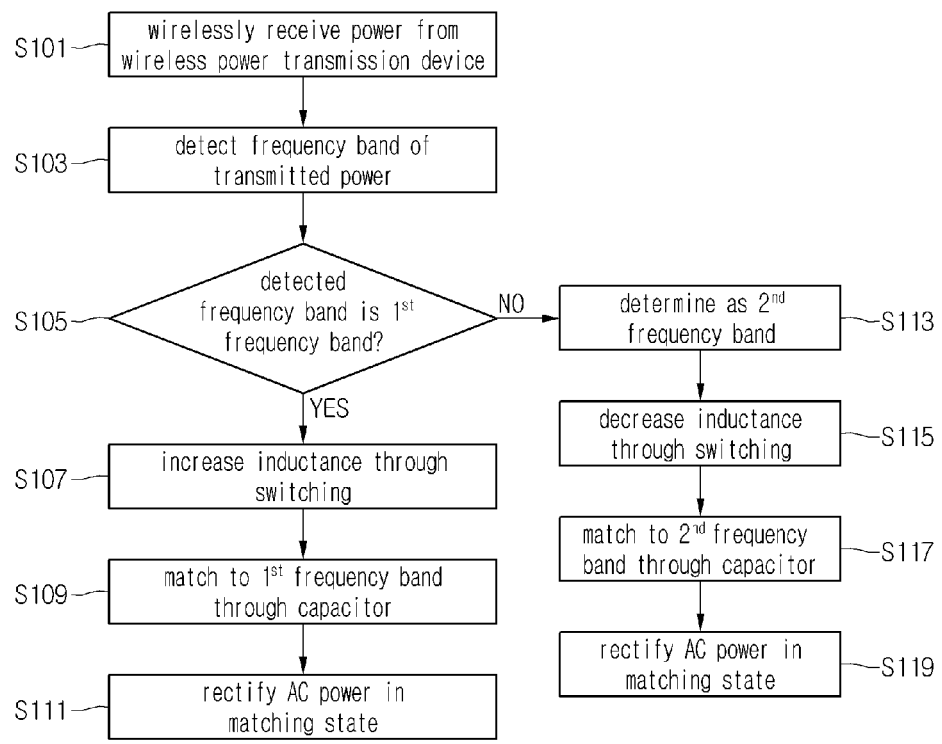

[Fig. 16]
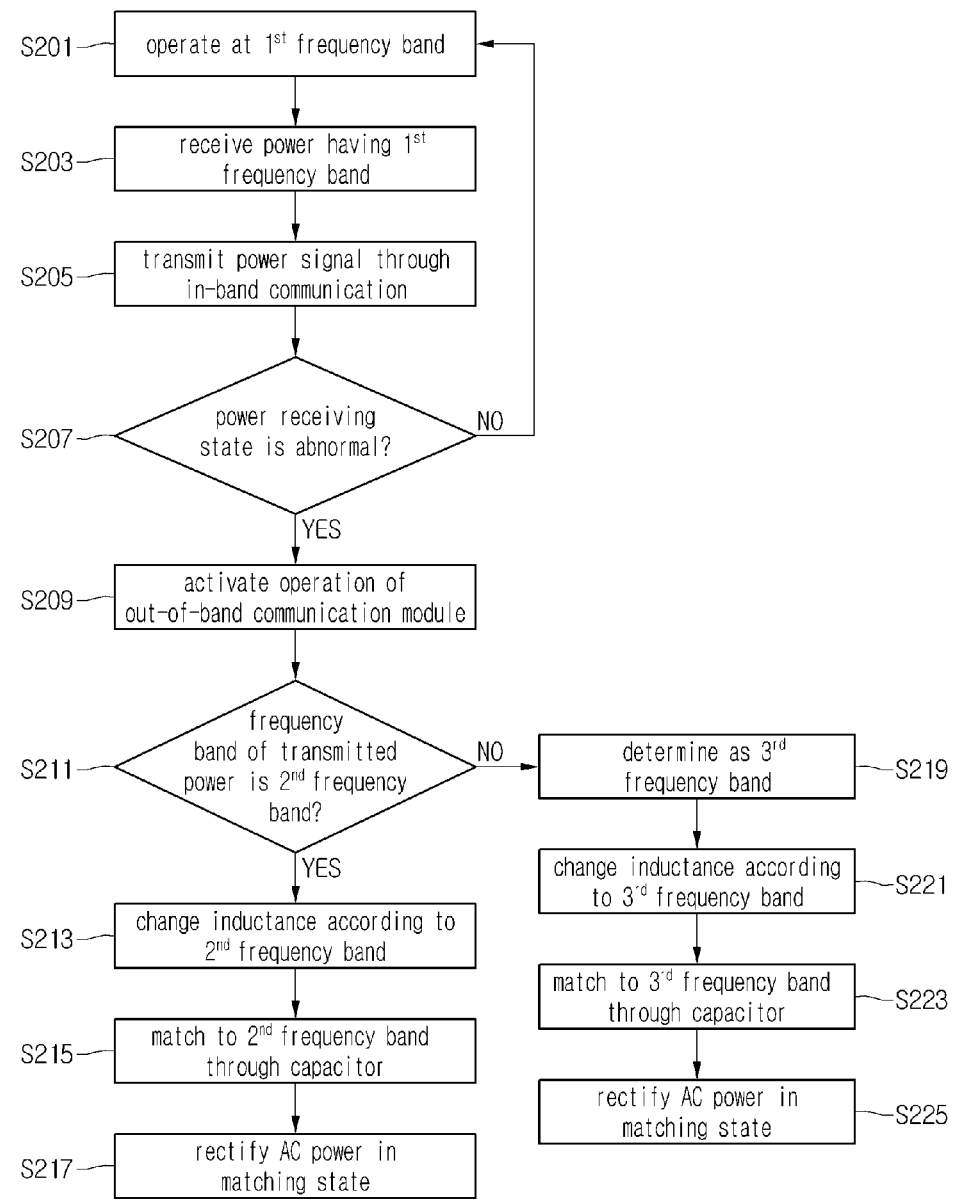

WIRELESS POWER RECEIVER WITH VARIABLE FREQUENCY AND METHOD OF CONTROLLING THE SAME

TECHNICAL FIELD

The disclosure relates to a wireless power transmission technology. More particularly, the disclosure relates to a wireless power receiver capable of wirelessly receiving power and a method of controlling the same.

BACKGROUND ART

A wireless power transmission or a wireless energy transfer refers to a technology of wirelessly transferring electric energy to desired devices. In the 1800 s, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. The electromagnetic induction refers to a phenomenon in which voltage is induced so that current flows when a magnetic field is varied around a conductor. Although the commercialization of the electromagnetic induction technology has been rapidly progressed around small-size devices, the power transmission distance thereof is short.

Until now, wireless energy transmission schemes include a remote telecommunication technology based on magnetic resonance and a short wave radio frequency in addition to the electromagnetic induction.

Recently, among wireless power transmitting technologies, an energy transmitting scheme employing electromagnetic induction and resonance has been widely used.

In a wireless power transmission system employing the electromagnetic induction and resonance, since an electrical signal formed between a transmitter and a receiver is wirelessly transmitted through a coil, a user can easily charge power in an electronic appliance such as a portable appliance.

However, in the conventional power transmission process, since various frequency bands are used in the transmitter, the receiver may not be sufficiently charged with power when the frequency used in the transmitter differs from that used in the receiver.

In addition, the receiver must use a plurality of coils in order to cover various frequency bands used in the transmitter.

The related art is disclosed in Korean Unexamined Patent Publication No. 10-2006-0058735 titled "Variable inductor for integrated circuit and printed circuit board".

DISCLOSURE OF INVENTION

Technical Problem

The disclosure provides a wireless power receiver capable of improving power transmission efficiency by varying a used frequency band depending on various frequency bands used in a wireless power transmitter, and a method of controlling the same.

Solution to Problem

A wireless power receiver to wirelessly receive power from a wireless power transmitter comprises a reception coil to receive the power wirelessly transmitted from the wireless power transmitter through a magnetic field, a frequency detecting unit to detect a frequency band of the power transmitted from the wireless power transmitter and an inductance varying unit to change an inductance of the reception coil according to the detected frequency band.

A wireless power receiver to wirelessly receive power from a wireless power transmitter comprises a reception coil to receive power having a first frequency band from the wireless power transmitter, a frequency detecting unit to detect if a frequency band of the power transmitted from the wireless power transmitter is the first frequency band and an inductance varying unit to change an inductance of the reception coil if the detected frequency band is out of the first frequency band.

Advantageous Effects of Invention

As described above, according to the embodiment, power can be efficiently transmitted by varying a used frequency band of the wireless power receiver depending on various frequency bands used in a wireless power transmitter, and a method of controlling the same.

Meanwhile, any other various effects will be directly and implicitly described below in the description of the embodiment.

BRIEF DESCRIPTION OF DRAWINGS

FIG. 1 is a circuit diagram showing the structure of a wireless power transmission system according to one embodiment.

FIG. 2 is a circuit diagram showing the structure of a wireless power transmission system according to another embodiment.

FIG. 3 is an equivalent circuit diagram of a first transmission coil according to one embodiment.

FIG. 4 is an equivalent circuit diagram of a power supply device and a wireless power transmitter according to one embodiment.

FIG. 5 is an equivalent circuit diagram showing a wireless power receiver according to one embodiment.

FIG. 6 is a block diagram showing a wireless power transmission system according to still another embodiment.

FIG. 7 is a block diagram showing the structure of a wireless power receiver according to another embodiment.

FIG. 8 is a block diagram to explain the operation of an inductance varying unit when the wireless power receiver according to another embodiment receives the power having a first frequency band.

FIG. 9 is a block diagram to explain the operation of the inductance varying unit when the wireless power receiver according to another embodiment receives the power having a second frequency band.

FIG. 10 is a view to explain the operation of the inductance varying unit when the wireless power receiver according to the embodiment receives the power having the first frequency band and the reception coil has the spiral structure.

FIG. 11 is a view to explain the operation of the inductance varying unit when the wireless power receiver according to the embodiment receives the power having the second frequency band and the reception coil has the spiral structure FIG. 12 is a view to explain the operation of the inductance varying unit when the wireless power receiver according to the embodiment receives the power having the first frequency band and the reception coil has the helical structure.

FIG. 13 is a view to explain the operation of the inductance varying unit when the wireless power receiver according to the embodiment receives the power having the second frequency band and the reception coil has the helical structure.

FIG. 14 is a view showing the structure of a wireless power receiver according to still another embodiment in which an MEMS switch is used as the inductance varying unit.

FIG. 15 is a flowchart showing the method of controlling the wireless power receiver according to one embodiment.

FIG. 16 is a flowchart to explain a method of controlling the wireless power receiver according to another embodiment.

BEST MODE FOR CARRYING OUT THE INVENTION

Hereinafter, embodiments will be described in detail with reference to accompanying drawings so that those skilled in the art can easily work with the embodiments.

FIG. 1 is a circuit diagram showing the structure of a wireless power transmission system 10 according to one embodiment.

Referring to FIG. 1, the wireless power transmission system 10 may include a power supply device 100, a wireless power transmitter 200, a wireless power receiver 300, and a load 400.

According to one embodiment, the power supply device 100 may be included in the wireless power transmitter 200.

The wireless power transmitter 200 may include a first transmission coil 210.

The wireless power receiver 300 may include a reception coil 310 and a rectifying unit 330.

Both terminals of the power supply device 100 are connected with both terminals of the first transmission coil 210.

Both terminals of the reception coil 310 are connected with both terminals of the rectifying unit 330, and the load 400 is connected with both terminals of the rectifying unit 330. According to one embodiment, the load 400 may be included in the wireless power receiver 300.

The power generated from the power supply device 100 is transmitted to the wireless power transmitter 200, and the power received in the wireless power transmitter 200 is transmitted to the wireless power receiver 300 through electromagnetic induction.

Hereinafter, the power transmission procedure between the wireless power transmitter 200 and the wireless power receiver 300 will be described in more detail.

The power supply device 100 generates AC power having a predetermined frequency to be transmitted to the wireless power transmitter 200.

The first transmission coil 210 and the reception coil 310 are inductively coupled with each other. In other words, if AC current flows through the first transmission coil 210 by power supplied from the power supply device 100, the AC current is induced into the reception coil 310 physically spaced apart from the first transmission coil 210 through the electromagnetic induction, so that AC power can be transmitted to the reception coil 310.

According to one embodiment, the frequency band of power transmitted from the first transmission coil 210 to the reception coil 310 may be in the range of 110 KHz to 205 KHz, but the embodiment is not limited thereto.

Thereafter, the power received in the reception coil 310 is rectified through the rectifying unit 330 and transmitted to the load 400.

According to one embodiment, the first transmission coil 210 and the reception coil 310 may have one of a spiral structure and a helical structure.

A quality factor and a coupling coefficient are important in the wireless power transmission. In other words, the power transmission efficiency can be more improved as the quality factor and the coupling coefficient represent greater values.

The quality factor may refer to an index of energy that may be stored in the vicinity of the wireless power transmitter 200 or the wireless power receiver 300.

The quality factor may be varied depending on the operating frequency ω as well as a shape, a dimension and a material of a coil. The quality factor may be expressed as following equation, $Q=\omega*L/R$. In the above equation, L refers to the inductance of a coil and R refers to resistance corresponding to the quantity of power loss caused in the coil.

The quality factor may have a value of 0 to infinity. As the quality factor is increased, the power transmission efficiency between the wireless power transmitter 200 and the wireless power receiver 300.

The coupling coefficient represents the degree of magnetic coupling between a transmission coil and a reception coil, and has a value of 0 to 1.

The coupling coefficient may vary according to the relative position and the relative distance between the transmission coil and the reception coil.

FIG. 2 is a circuit diagram showing the structure of a wireless power transmission system 20 according to another embodiment.

Referring to FIG. 2, the wireless power transmission system 20 according to another embodiment may include the power supply device 100, the wireless power transmitter 200, the wireless power receiver 300, and the load 400.

According to one embodiment, the power supply device 100 may be included in the wireless power transmitter 200.

The wireless power transmitter 200 may include the first transmission coil 210 and a second transmission coil 220.

Both terminals of the first transmission coil 210 may be connected with both terminals of the power supply device 100.

The second transmission coil 220 may be spaced apart from the first transmission coil 210 by a predetermined distance.

The wireless power receiver 300 may include the reception coil 310 and the rectifying unit 330.

Both terminals of the reception coil 310 are connected with both terminals of the rectifying unit 330, and the load 400 is connected with both terminals of the rectifying unit 330. According to one embodiment, the load 400 may be included in the wireless power receiver 300.

The power generated from the power supply device 100 may be transmitted to the wireless power transmitter 200, and the power received in the wireless power transmitter 200 may be transmitted to the wireless power receiver 300 through electromagnetic induction or resonance.

Hereinafter, the power transmission procedure between the wireless power transmitter 200 and the wireless power receiver 300 will be described in more detail.

The power supply device 100 generates AC power having a predetermined frequency to be transmitted to the wireless power transmitter 200. The AC power received in the first transmission coil 210 may be transmitted to the second transmission coil 220 through electromagnetic induction. In other words, the first transmission coil 210 and the second transmission coil 220 are inductively coupled with each other. In other words, if AC current flows through the first transmission coil 210 by power supplied from the power supply device 100, the AC current is induced into the second transmission coil 220 physically spaced apart from the first transmission coil 210 through the electromagnetic induction, so that AC power can be transmitted to the second transmission coil 220.

The second transmission coil 220 may transmit the AC power, which is received therein from the first transmission coil 210, to the reception coil 310 of the wireless power receiver 300 through resonance or electromagnetic induction.

When the second transmission coil 220 transmits power to the reception coil 310 through resonance, the second transmission coil 220 and the reception coil 310 are resonance-coupled with each other so that the second transmission coil 220 and the reception coil 310 operate at a resonance frequency band. Due to the resonance-coupling between the second transmission coil 220 and the reception coil 310, the power transmission efficiency between the wireless power transmitter 200 and the wireless power receiver 300 can be greatly improved.

The frequency band of transmitted power in the case that the second transmission coil 220 transmits power to the reception coil 310 through resonance may be different from the frequency band of transmitted power in the case that the second transmission coil 220 transmits power to the reception coil 310 through electromagnetic induction.

According to one embodiment, when the second transmission coil 220 transmits the power to the reception coil 310 through resonance, the frequency band of the transmitted power may be 6.78 MHz, but the embodiment is not limited thereto.

According to one embodiment, when the second transmission coil 220 transmits the power to the reception coil 310 through electromagnetic induction, the frequency band of the transmitted power may be in the range of 110 MHz to 205 MHz, but the embodiment is not limited thereto.

As described above, when the second transmission coil 220 transmits the power to the reception coil 310 through resonance or electromagnetic induction, as different frequency bands are used for power transmission, a frequency band matching work is required so that the frequency band used in the wireless power receiver 300 is matched with the frequency band used in the second transmission coil 220. The details thereof will be made below by making reference to the following description of FIGS. 5 to 16.

FIG. 3 is an equivalent circuit diagram of the first transmission coil 210 according to one embodiment.

As shown in FIG. 3, the first transmission coil 210 may include an inductor L1 and a capacitor C1, and a circuit having a proper inductance and a proper capacitance is configured by the inductor L1 and the capacitor C1.

The first transmission coil 210 may be configured in the form of an equivalent circuit in which both terminals of the inductor L1 are connected with both terminals of the capacitor C1. In other words, the first transmission coil 210 may be configured in the form of an equivalent coil in which the inductor L1 is connected with the capacitor C1 in parallel.

The capacitor C1 may include a variable capacitor, and impedance matching may be performed as the capacitance of the capacitor C1 is adjusted. Equivalent circuits of the second transmission coil 220 and the reception coil 310 may have the same form as that shown in FIG. 3.

FIG. 4 is an equivalent circuit diagram of the power supply device 100 and the wireless power transmitter 200 according to one embodiment.

As shown in FIG. 4, the first transmission coil 210 and the second transmission coil 220 may include inductors L1 and L2 having predetermined inductances and capacitors C1 and C2 having predetermined capacitances.

FIG. 5 is an equivalent circuit diagram showing the wireless power receiver 300 according to one embodiment.

As shown in FIG. 5, the reception coil 310 may include an inductor L3 having a predetermined inductance and a capacitor C3 having a predetermined capacitance.

The rectifying unit 330 rectifies AC power received therein from the reception coil 310 into DC power and may transmit the rectified DC power to the load 400.

In detail, the rectifying unit 330 may include a rectifier and a smoothing circuit. According to one embodiment, the rectifier may include a silicon rectifier, and may be equivalent to a diode D1.

The rectifier may convert the AC power received therein from a reception induction coil 320 into DC power.

The smoothing circuit may output smooth DC power by removing an AC component from the DC power converted by the rectifier. According to one embodiment, the smoothing circuit may include a rectification capacitor C5 as shown in FIG. 4, but the embodiment is not limited thereto.

The load 400 may be a predetermined rechargeable battery or device requiring the DC power. For example, the load 400 may refer to a battery.

The wireless power receiver 300 may be embedded in an electronic appliance such as a cellular phone, a mouse, and a laptop computer. Accordingly, the reception coil 310 may have the shape suitable for the shape of an electronic appliance.

The wireless power transmitter 200 may interchange information with the wireless power receiver 300 through in-band communication or out-of-band communication.

The in-band communication refers to the communication for interchanging information between the wireless power transmitter 200 and the wireless power receiver 300 through a signal having the frequency used in the wireless power transmission. The wireless power receiver 300 may further include a switch and may receive or may not receive power transmitted from the wireless power transmitter 200 through a switching operation of the switch. Accordingly, the wireless power transmitter 200 can recognize an on-signal or an off-signal of the wireless power receiver 300 by detecting the quantity of power consumed in the wireless power transmitter 200.

In detail, the wireless power receiver 300 may change the power consumed in the wireless power transmitter 200 by adjusting the quantity of power absorbed in a resistor by using the resistor and the switch. The wireless power transmitter 200 may acquire the state information of the wireless power receiver 300 by detecting the variation of the power consumption. The switch may be connected with the resistor in series. According to one embodiment, the state information of the wireless power receiver 300 may include information about the present charge quantity and the change of the charge quantity in the wireless power receiver 300.

In more detail, if the switch is open, the power absorbed in the resistor becomes zero, and the power consumed in the wireless power transmitter 200 is reduced.

If the switch is short-circuited, the power absorbed in the resistor becomes greater than zero, and the power consumed in the wireless power transmitter 200 is increased. If the wireless power receiver repeats the above operation, the wireless power transmitter 200 detects power consumed therein to make digital communication with the wireless power receiver 300.

The wireless power transmitter 200 receives the state information of the wireless power receiver 300 through the above operation so that the wireless power transmitter 200 can transmit appropriate power.

To the contrary, a resistor and a switch are provided at the side of the wireless power transmitter 200 so that the state information of the wireless power transmitter 200 can be transmitted to the wireless power receiver 300. According to one embodiment, the state information of the wireless power transmitter 200 may include information about the maximum quantity of power to be supplied from the wireless power transmitter 200, the number of wireless power receivers 300 receiving the power from the wireless power transmitter 200 and the quantity of available power of the wireless power transmitter 200.

Hereinafter, the out-of-band communication will be described.

The out-of-band communication refers to the communication performed through a specific frequency band other than the resonance frequency band in order to exchange information necessary for the power transmission. The wireless power transmitter 200 and the wireless power receiver 300 can be equipped with out-of-band communication modules to exchange information necessary for the power transmission. The out-of-band communication module may be installed in the power supply device. According to one embodiment, the out-of-band communication module may use a short-range communication technology, such as Bluetooth, Zigbee, WLAN or NFC, but the embodiment is not limited thereto.

Hereinafter, a scheme of matching frequencies by varying an inductance of a reception coil according to frequency bands used in wireless power transmission will be described with reference to FIGS. 6 to 14.

FIG. 6 is a block diagram showing a wireless power transmission system according to still another embodiment.

Referring to FIG. 6, the wireless power transmission system 10 according to still another embodiment may include the power supply device 100, the wireless power transmitter 200, the wireless power receiver 300, and the load 400.

The power supply device 100, the wireless power transmitter 200, and the load 400 are the same as those described with reference to FIGS. 2 to 5, and the details thereof will be omitted.

The wireless power receiver 300 may include the reception coil 310, a frequency detecting unit 350, an inductance varying unit 360, a frequency matching unit 370, and the rectifying unit 330.

The reception coil 310 may wirelessly receive power from the wireless power transmitter 200.

When the reception coil 310 wirelessly receives power from the wireless power transmitter 200, the reception coil 310 is magnetically coupled with the second transmission coil 220 provided in the wireless power transmitter 200 so that the reception coil 310 may wirelessly receive power from the second transmission coil 220 through a magnetic field.

When the wireless power transmitter 200 wirelessly transmits power to the reception coil 310, the power transmitted from the wireless power transmitter 200 to the reception coil 310 may have various frequency bands. For example, according to one embodiment, the power transmitted from the wireless power transmitter 200 to the reception coil 310 may have three frequency bands.

A first frequency band may be in the range of 110 KHz to 205 KHz, and may include a frequency band used in the WPC (Wireless Power Consortium) which is a technical standard to wirelessly transmit power through electromagnetic induction. In this case, an outer diameter of the reception coil 310 may be 40 mm, but the embodiment is not limited thereto.

A second frequency band may be 6.78 MHz, and may include a frequency band used in the A4WP (Alliance for Wireless Power) which is a technical standard to wirelessly transmit power through resonance. In this case, an outer diameter of the reception coil 310 may be 20 mm, but the embodiment is not limited thereto.

A third frequency band may be in the range of 206 KHz to 300 KHz, and may include a frequency band used in the PMA (Power Matters Alliance) which is a technical standard to wirelessly transmit power through electromagnetic induction. In this case, an outer diameter of the reception coil 310 may be 35 mm, but the embodiment is not limited thereto.

However, the numerical value of the frequency band is provided, but the embodiment is not limited thereto.

The reception coil 310 may have one of a spiral structure and a helical structure, but the embodiment is not limited thereto. In other words, the reception coil 310 may have various shapes.

According to one embodiment, when the wireless power receiver 300 is mounted on a mobile terminal such as a cellular phone, the reception coil 310 may have a spiral structure.

If the reception coil 310 is realized as an equivalent circuit, the reception coil 310 may be expressed in the structure including an inductor having a proper inductance.

The frequency detecting unit 350 may detect a frequency band of power received by the reception coil 310. According to one embodiment, the frequency detecting unit 350 may detect the frequency band of the power received by the reception coil through the in-band communication or the out-of-band communication.

According to one embodiment, when the wireless power receiver 300 receives power having a first frequency band from the wireless power transmitter 200, the wireless power receiver 300 may make communication with the wireless power transmitter 200 through the in-band communication. In this case, the frequency detecting unit 350 may send a ping signal to the wireless power transmitter 200 and may detect a frequency band based on a response signal to the ping signal. In this case, the first frequency band may be in the range of 110 KHz to 205 KHz, and may be a frequency band used in a WPC (Wireless Power Consortium) which is a technical standard to wirelessly transmit power through electromagnetic induction.

The ping signal may be a signal to determine if the wireless power receiver 300 normally receives the power having the first frequency band from the wireless power transmitter 200.

If the frequency detecting unit 350 does not receive the response signal to the ping signal, the frequency detecting unit 350 determines that the wireless power transmitter 100 transmits power having the second frequency band. Accordingly, the frequency detecting unit 350 may determine if the frequency band is the first frequency band or the second frequency band. In this case, the second frequency band may be 6.78 MHz, and may be a frequency band used in the A4WP (Alliance for Wireless Power) which is a technical standard to wirelessly transmit power through resonance.

According to one embodiment, when the frequency detecting unit 350 does not receive the response signal to the ping signal, the frequency detecting unit 350 may stop the in-band communication with the wireless power transmitter 200, and may detect the frequency of power transmitted from the wireless power transmitter 200 through the out-of-band communication.

When the frequency detecting unit 350 detects the frequency band having power received by the reception coil 310 through the out-of-band communication, the frequency detecting unit 350 may include one among short range communication modules for Bluetooth, Zigbee, WLAN, and NFC.

Since the in-band-communication and the out-of-band communication have been described with reference to FIG. 5, the details thereof will be omitted.

The inductance varying unit 360 may change the inductance of the reception coil 310 according to the frequency band detected by the frequency detecting unit 350. In detail, as the frequency band of the power received by the reception coil 310 represents a lower value, the inductance varying unit 360 increases the inductance of the reception coil 310. As the frequency band of the power received by the reception coil 310 represents a higher value, the inductance varying unit 360 may decrease the inductance of the reception coil 310. The details thereof will be described below.

After the inductance varying unit 360 changes the inductance of the reception coil 310 according to the detected frequency band, the frequency matching unit 370 may match the specific frequency by using the changed inductance. In this case, the specific frequency may refer to a frequency band detected by the frequency detecting unit 350.

In other words, the frequency matching unit 370 enables more exact matching to the frequency of the power transmitted from the wireless power transmitter 200.

After matching the frequency band used by the wireless power receiver 300 to the frequency band of the power transmitted from the wireless power transmitter 200, the frequency matching unit 370 may output the AC power in the matching state to the rectifying unit 300.

The rectifying unit 330 may receive the AC power in the matching state from the frequency matching unit 370 and rectify the AC power in the matching state into DC power.

The rectifying unit 330 may transmit the rectified DC power to the load 400 and charge the load 400 with the DC power.

FIG. 7 is a block diagram showing the structure of a wireless power receiver according to another embodiment, and FIG. 8 is a block diagram to explain the operation of the inductance varying unit when the wireless power receiver according to another embodiment receives the power having the first frequency band. FIG. 9 is a block diagram to explain the operation of the inductance varying unit when the wireless power receiver according to another embodiment receives the power having the second frequency band.

Referring to FIG. 7, the wireless power receiver 300 according to another embodiment may include the reception coil 310, the frequency detecting unit 350, the inductance varying unit 360, the frequency matching unit 370 and the rectifying unit 330.

The inductance varying unit 360 may include at least one switch, and each switch may connect one terminal of the reception coil 310 with one terminal of the frequency matching unit 370, and connect an opposite terminal of the reception coil 310 with an opposite terminal of the frequency matching unit 330. Although FIG. 7 shows that the inductance varying unit 360 includes two switches, the embodiment is not limited thereto.

According to one embodiment, the switch included in the inductance varying unit 360 may include a MEMS (Micro Electro Mechanical System) switch. A MEMS technology refers to a technology of manufacturing ultra-precision machinery having the size of micron (um) or millimeters (mm) based on a semiconductor process technology. Since the MEMS switch included in the inductance varying unit 360 has a significantly small size, the MEMS switch is applicable to the wireless power receiver 300 that must be down-scaled.

Hereinafter, the inductance varying unit 360 will be described on the assumption that the inductance varying unit 360 includes two switches of a first switch 361 and a second switch 363.

The inductance varying unit 360 may change the inductance according to the frequency band of the power received by the reception coil 310 which is detected by the frequency detecting unit 350. In other words, the inductance varying unit 360 may change the inductance of the reception coil 310 by actuating the first and second switches 361 and 363 according to the detected frequency band.

The inductance of the reception coil 310 is changed according to the frequency band of the power received by the reception coil 310 so that the power having various frequency bands is stably transmitted through the frequency matching. This can be confirmed through the relationship equation between the frequency used in the transmission of an electromagnetic wave and the inductance. In other words, the relationship equation between the frequency f and the inductance L of the reception coil 310 may be expressed as Equation 1.

$$f = 1/2\pi\sqrt{LC} \qquad \text{[equation 1]}$$

As the frequency f is increased, the inductance L must be relatively decreased. As the frequency f is decreased, the inductance L must be relatively increased. In more detail, as the frequency f is increased, the wavelength h is shorted (f=c/h), lower inductance is required. As the frequency f is decreased, the wavelength h is lengthened, so that greater inductance is required.

After the inductance varying unit 360 changes the inductance of the reception coil 310 according to the detected frequency band, the frequency matching unit 370 may match the specific frequency by using the changed inductance. In this case, the specific frequency may refer to a frequency band detected by the frequency detecting unit 350.

In other words, the frequency matching unit 370 enables more exact matching to the frequency of the power transmitted from the wireless power transmitter 200.

According to one embodiment, the frequency matching unit 370 may include at least one capacitor connected with the reception coil 310. The capacitor may include a fixed capacitor or a variable capacitor. When the variable capacitor is used as the frequency matching unit 370, a control unit (not shown) of the wireless power receiver 300 may adjust the capacitance of the capacitor according to the inductance changed by the inductance varying unit 360 so that the matching is achieved at each frequency band. In other words, the capacitance of the capacitor must be adjusted according to the changed inductance of the reception coil 310 so that the matching is achieved at the transmitted frequency band.

As the capacitance of the capacitor is adjusted, the frequency matching unit 370 may match the frequency band of the power transmitted from the wireless power transmitter 200 to the frequency band of the wireless power receiver 300.

The wireless power receiver 300 according to the embodiment may change the inductance of the reception coil 310 through the operation of the inductance varying unit 360 according to the case that the power having the first frequency band is received and the case that the power having the second frequency band is received. Therefore, the wireless power receiver 300 may cover both of the case that the wireless power transmitter 200 transmits the power having the first frequency band and the case that the wireless power transmitter 200 transmits the power having the second frequency band. Accordingly, the convenience of the user can be improved. The details thereof will be described in more detail with reference to FIGS. 8 and 9.

FIG. 8 is a block diagram to explain the procedure of changing the inductance of the reception coil 310 when the wireless power receiver 300 wirelessly receives the power having the first frequency band from the wireless power transmitter 200. FIG. 9 is a block diagram to explain the procedure of changing the inductance of the reception coil 310 when the wireless power receiver 300 wirelessly receives the power having the second frequency band from the wireless power transmitter 200.

Referring to FIG. 8, if the frequency band detected by the frequency detecting unit 350 is the first frequency band of 110 KHz to 205 KHz, the inductance varying unit 360 connects the first switch 361 with a first terminal A of the reception coil 310, and connects the second switch 363 with a third terminal C of the reception coil 310. In other words, since the first frequency band is lower than the second frequency band of 6.78 MHz, the inductance varying unit 360 may control the operation of the first switch 361 and the second switch 363 as shown in FIG. 8 so that the length of the reception coil 310 is increased in order to increase the inductance of the reception coil 310. In this case, the inductance of the reception coil 310 may be expressed as a reference sign L3. According to one embodiment, the inductance L3 may have the range of 10 uH to 15 uH.

In addition, as the inductance of the reception coil 310 is changed to L3, the capacitance of the capacitor C6 of the frequency matching unit 370 may be adjusted so that the frequency band of the wireless power receiver 300 is matched to the first frequency band. According to one embodiment, the capacitance of the capacitor C6 may be 1.8 nF, but the embodiment is not limited thereto. In addition, an additional capacitor, which is connectable with the reception coil 310 in series, may be provided at one terminal of the capacitor C6 for the purpose of frequency matching. The capacitance of the additional capacitor may be 183 nF, but the embodiment is not limited thereto.

Accordingly, the frequency band of the wireless power receiver 300 may be matched to the first frequency band of the power transmitted from the wireless power transmitter 200.

Referring to FIG. 9, when the frequency band detected by the frequency detecting unit 350 is the second frequency band of 6.78 MHz, the inductance varying unit 360 connects the first switch 361 with the second terminal B of the reception coil 310, and connects the second switch 363 with the third terminal C of the reception coil 310. In other words, since the second frequency band is higher than the first frequency band, the inductance varying unit 360 may control the operation of the first switch 361 and the second switch 363 as shown in FIG. 9 so that the length of the reception coil 310 is shortened in order to decrease the inductance of the reception coil 310. In this case, the inductance of the reception coil 310 may be expressed as a reference sign L4. According to one embodiment, the inductance L4 may have the range of 1.5 uH to 2 uH.

In addition, as the inductance of the reception coil 310 is changed to L4, the capacitance of the capacitor C7 of the frequency matching unit 370 may be adjusted so that the frequency band of the wireless power receiver 300 is matched to the second frequency band. According to one embodiment, the capacitance of the capacitor C7 may be 470 pF, but the embodiment is not limited thereto. In addition, an additional capacitor, which is connectable with the reception coil 310 in series, may be provided at one terminal of the capacitor C7 for the purpose of frequency matching. The capacitance of the additional capacitor may be 360 pF, but the embodiment is not limited thereto.

Accordingly, the frequency band of the wireless power receiver 300 may be matched to the second frequency band of the power transmitted from the wireless power transmitter 200.

According to one embodiment, when the frequency band detected by the frequency detecting unit 350 is the third frequency band of 205 KHz to 300 KHz, the frequency detecting unit 360 may connect the first switch 361 with the first terminal A of the reception coil 310, and connect the second switch 363 with the second terminal B of the reception coil 310. In other words, since the third frequency band is higher than the first frequency band and lower than the second frequency band, the inductance varying unit 360 may control the operations of the first switch 361 and the second switch 363 so that the inductance of the reception coil 310 has an intermediate value between L3 and L4. In this case, the inductance L4 may be in the range of 4 uH to 5 uH.

In addition, as the inductance of the reception coil 310 is changed to the intermediate value between L3 and L4, the capacitance of the capacitor of the frequency matching unit 370 may be adjusted so that the frequency band of the wireless power receiver 300 is matched to the third frequency band. According to one embodiment, the capacitance of the capacitor may be 5 nF, but the embodiment is not limited thereto. In addition, an additional capacitor, which is connectable with the reception coil 310 in series, may be provided at one terminal of the capacitor for the purpose of frequency matching. The capacitance of the additional capacitor may be 120 nF, but the embodiment is not limited thereto. As shown in FIGS. 7 to 9, the wireless power receiver 300 according to the embodiment may change the inductance of the reception coil 310 according to the frequency band of the power transmitted from the wireless power transmitter 200.

Accordingly, although the wireless power transmitter 200 uses various frequency bands in power transmission, the wireless power receiver 300 may cover the various frequency bands. Therefore, when a user charges a terminal equipped with the wireless power receiver 300, the user can conveniently charge the terminal regardless of the frequency band used in the wireless power transmitter 200.

The terminal may include one of a mobile phone, an MP3, and a smart appliance, but the embodiment is not limited thereto. The terminal is applicable to all electronic appliances that can be wirelessly charged.

Hereinafter, applications of the embodiment according to the shapes of the reception coil will be described with reference to FIGS. 10 to 13.

First, description will be made with reference to FIGS. 10 and 11 regarding an example that the inductance of the reception coil 310 is changed when the reception coil 310 has a spiral structure.

FIG. 10 is a view to explain the operation of the inductance varying unit when the wireless power receiver according to the embodiment receives the power having the first frequency band and the reception coil has the spiral structure. FIG. 11 is a view to explain the operation of the inductance varying unit when the wireless power receiver according to the embodiment receives the power having the second frequency band and the reception coil has the spiral structure.

Referring to FIGS. 10 and 11, the wireless power receiver 300 may include the reception coil 310, the frequency detecting unit 350, the inductance varying unit 360, the frequency matching unit 370, and the rectifying unit 330 similarly to the structure of the wireless power receiver 300 described with reference to FIG. 6.

Referring to FIG. 10, the reception coil 310 has a spiral structure in which one conductive line has a spiral shape on a flat surface.

In the reception coil 310 having the spiral structure, a thickness T1 is 100 um, a line width W1 is 600 um, and a spacing S1 is 100 um, but the above numeric values are provided, but the embodiment is not limited thereto.

In FIG. 10, when the frequency band detected by the frequency detecting unit 350 is the first frequency band of 110 KHz to 205 KHz, the inductance varying unit 360 connects the first switch 361 with the first terminal A of the reception coil 310, and connects the second switch 363 with the third terminal C of the reception coil 310. In other words, since the first frequency band is lower than the second frequency band, the inductance varying unit 360 may control the operations of the first and second switches 361 and 363 as shown in FIG. 10 so that the length of the reception coil 310 is lengthened in order to increase the inductance of the reception coil 310. In this case, the changed inductance of the reception coil 310 may be expressed as L3, and the first and second switches 361 and 363 may include MEMS switches, and may be operated by external power.

Further, as the inductance of the reception coil 310 is changed to L3, the capacitance of the capacitor of the frequency matching unit 370 may be adjusted so that the frequency band of the wireless power receiver 300 is matched to the first frequency band.

Therefore, the frequency band of the wireless power receiver 300 may be matched to the first frequency band of the power transmitted from the wireless power transmitter 200.

In FIG. 11, when the frequency band detected by the frequency detecting unit 350 is the second frequency band of 6.78 MHz, the inductance varying unit 360 connects the first switch 361 with the second terminal B of the reception coil 310, and connects the second switch 363 with the third terminal C of the reception coil 310. In other words, since the second frequency band is higher than a frequency band of power transmitted through electromagnetic induction, the inductance varying unit 360 may control the operations of the first and second switches 361 and 363 as shown in FIG. 11 so that the length of the reception coil 310 is shortened in order to decrease the inductance of the reception coil 310. In this case, the changed inductance of the reception coil 310 may be expressed as L4, and L4 is smaller than L3.

In other words, as shown in FIG. 11, as the length of the reception coil 310 is provided from the second terminal B to the third terminal C due to the switching operation of the inductance varying unit 360, the length of the reception coil 310 is shortened. In addition, the length of the reception coil 310 is shortened by the length from the first terminal A to the second terminal B of the reception coil 310, so that the inductance of the reception coil 310 may be reduced.

Further, as the inductance of the reception coil 310 is changed to L4, the capacitance of the capacitor of the frequency matching unit 370 may be adjusted so that the frequency band of the wireless power receiver 300 is matched to the second frequency band.

Therefore, the frequency band of the wireless power receiver 300 may be matched to the second frequency band of the power transmitted from the wireless power transmitter 200.

According to one embodiment, although the first terminal A of the reception coil 310, which is switched off, may be provided in an open state, the first terminal A of the reception coil 310 may be grounded through a third switch 365 as shown in FIG. 11. In this case, the inductance varying unit 360 may further include the third switch 356. The first terminal A of the reception coil 310 is grounded so that the loop of the reception coil 310 formed from the second terminal B to the third terminal C is electrically isolated from the loop of the reception coil 310 formed from the first terminal A to the second terminal B to prevent the frequency interference.

In other words, the first terminal A of the reception coil 310 is grounded thereby preventing the frequency interference that may occur in the procedure that the loop of the reception coil 310 formed from the second terminal B to the third terminal C receives power from the wireless power transmitter 200.

According to one embodiment, when the frequency band detected by the frequency detecting unit 350 is the third frequency band of 205 KHz to 300 KHz, the inductance varying unit 360 may connect the first switch 361 to the first terminal A of the reception coil 310, and connect the second switch 363 to the second terminal B of the reception coil 310. In other words, since the third frequency band is higher than the first frequency band and lower than the third frequency band, the inductance varying unit 360 may control the operations of the first and second switches 361 and 363 so that the inductance of the reception coil 310 has the value between L3 and L4. In addition, as the inductance of the reception coil 310 is changed to the value between L3 and L4, the capacitance of the capacitor of the frequency matching unit 370 can be adjusted so that the frequency band of the wireless power receiver 300 is matched to the third frequency band.

Hereinafter, description will be made with reference to FIGS. 12 and 13 regarding an example that the inductance of the reception coil 310 is changed when the reception coil 310 has a helical structure.

Referring to FIGS. 12 and 13, the wireless power receiver 300 may include the reception coil 310, the frequency detecting unit 350, the inductance varying unit 360, the frequency matching unit 370, and the rectifying unit 330 similarly to the structure of the wireless power receiver 300 described with reference to FIG. 6.

The reception coil 310 has a helical structure in which one conductive line has a 3-D spiral shape.

In the reception coil 310 having the helical structure, a thickness T2 is 100 um, a line width W2 is 600 um, and a spacing S2 is 100 um, but the above numeric values are provided, but the embodiment is not limited thereto.

In FIG. 12, when the frequency band detected by the frequency detecting unit 350 is the first frequency band of 110 KHz to 205 KHz, the inductance varying unit 360 connects the first switch 361 with the first terminal A of the reception coil 310, and connects the second switch 363 with the third terminal C of the reception coil 310. In other words, since the first frequency band is lower than the second frequency band, the inductance varying unit 360 may control the operations of the first and second switches 361 and 363 as shown in FIG. 12 so that the length of the reception coil 310 is lengthened in order to increase the inductance of the reception coil 310. In this case, the inductance of the reception coil 310 may be changed to L3.

In addition, as the inductance of the reception coil 310 is changed to L3, the capacitance of the capacitor of the frequency matching unit 370 can be adjusted so that the frequency band of the wireless power receiver 300 is matched to the first frequency band.

Accordingly, the frequency band of the wireless power receiver 300 may be matched to the first frequency band of the power transmitted from the wireless power transmitter 200.

In FIG. 13, when the frequency band detected by the frequency detecting unit 350 is the second frequency band of 6.78 MHz, the inductance varying unit 360 connects the first switch 361 with the second terminal B of the reception coil 310, and connects the second switch 363 with the third terminal C of the reception coil 310. In other words, since the second frequency band is higher than the first frequency band, the inductance varying unit 360 may control the operations of the first and second switches 361 and 363 as shown in FIG. 13 so that the length of the reception coil 310 is shortened in order to decrease the inductance of the reception coil 310. In this case, the inductance of the reception coil 310 may be changed to L4, and L4 is smaller than L3.

In addition, as the inductance of the reception coil 310 is changed to L4 the capacitance of the capacitor of the frequency matching unit 370 can be adjusted so that the frequency band of the wireless power receiver 300 is matched to the second frequency band.

Accordingly, the frequency band of the wireless power receiver 300 may be matched to the second frequency band of the power transmitted from the wireless power transmitter 200.

According to one embodiment, although the first terminal A of the reception coil 310, which is switched off, may be provided in an open state, the first terminal A of the reception coil 310 may be grounded through the third switch 365 as shown in FIG. 13. In this case, the inductance varying unit 360 may further include the third switch 356. The first terminal A of the reception coil 310 is grounded so that the loop of the reception coil 310 formed from the second terminal B to the third terminal C is electrically isolated from the loop of the reception coil 310 formed from the first terminal A to the second terminal B to prevent the frequency interference.

In other words, the first terminal A of the reception coil 310 is grounded thereby preventing the frequency interference that may occur in the procedure that the loop of the reception coil 310 formed from the second terminal B to the third terminal C receives power from the wireless power transmitter 200.

According to one embodiment, when the frequency band detected by the frequency detecting unit 350 is the third frequency band of 205 KHz to 300 KHz, the inductance varying unit 360 may connect the first switch 361 to the first terminal A of the reception coil 310, and connect the second switch 363 to the second terminal B of the reception coil 310. In other words, since the third frequency band is higher than the first frequency band and lower than the third frequency band, the inductance varying unit 360 may control the operations of the first and second switches 361 and 363 so that the inductance of the reception coil 310 has the value between L3 and L4. In addition, as the inductance of the reception coil 310 is changed to the value between L3 and L4, the capacitance of the capacitor of the frequency matching unit 370 can be adjusted so that the frequency band of the wireless power receiver 300 is matched to the third frequency band.

FIG. 14 is a view showing the structure of a wireless power receiver according to still another embodiment in which an MEMS switch is used as the inductance varying unit.

Referring to FIG. 14, the wireless power receiver 300 according to still another embodiment may include the reception coil 310, the frequency detecting unit 350, the inductance varying unit 360, the frequency matching unit 370, and the rectifying unit 330.

The inductance varying unit 360 may include at least one MEMS switch. Since the MEMS switch represents the characteristics of low insertion loss and high isolation, requires low cost, and has a significantly small size, the MEMS switch is applicable to the wireless power receiver 300 that must be down-scaled.

Although FIG. 14 shows the case that the inductance varying unit 360 employs three MEMS switches having an SPST (Single Pole Single Throw) type, the embodiment is not limited thereto. The inductance varying unit 360 may use various types of MEMS switches and the different number of the MEMS switches.

The inductance varying unit 360 may include three MEMS switches, that is, a first MEMS switch 366, a second MEMS switch 367 and a third MEMS switch 368.

Each MEMS switch may include a power supply unit K, a gate terminal G, a source terminal S, and a drain terminal D.

The power supply unit K may be connected with the gate terminal G, the source terminal S may be connected with one terminal of the reception coil 310, and each drain terminal D may be connected with the frequency matching unit 370.

The MEMS switch serves as a switch operating by the power supply unit K. The MEMS switch may be turned on or turned off according to voltage applied between the gate terminal G and the source terminal S of the MEMS switch. That is to say, in order to turn on the MEMS switch, the voltage of 5V may be applied between the gate terminal G and the source terminal S. In order to turn off the MEMS switch, the voltage of 0V is applied between the gate terminal G and the source terminal S. In this case, voltages of 5V and 0V are provided, but the embodiment is not limited thereto.

In detail, when the frequency band detected by the frequency detecting unit 350 is the first frequency band in the range of 110 KHz to 205 KHz, the inductance varying unit 360 may turn on the first MEMS switch 366 through the power supply unit K, turn on the third MEMS switch 368, and turn off the second MEMS switch 367. In other words, since the first frequency band is lower than the second frequency band of 6.78 MHz, the inductance varying unit 360 may control the operation of each MEMS switch so that the length of the reception coil 310 is lengthened in order to increase the inductance of the reception coil 310. In this case, the changed inductance of the reception coil 310 may be expressed as L3.

In addition, as the inductance of the reception coil 310 is changed to L3, the capacitance of the capacitor of the frequency matching unit 370 may be adjusted so that the frequency band of the wireless power receiver 300 is matched to the first frequency band.

If the frequency band detected by the frequency detecting unit 350 is the second frequency band of 6.78 MHz, the inductance varying unit 360 may turn off the first MEMS switch 366 through the power supply unit K, and may turn off the second and third MEMS switches 367 and 368. In other words, since the second frequency band is higher than the first frequency band of 6.78 MHz, the inductance varying unit 360 may control the operation of each MEMS switch so that the length of the reception coil 310 is shortened in order to decrease the inductance of the reception coil 310. In this case, the changed inductance of the reception coil 310 may be expressed as L4.

In addition, as the inductance of the reception coil 310 is changed to L4, the capacitance of the capacitor of the frequency matching unit 370 may be adjusted so that the frequency band of the wireless power receiver 300 is matched to the second frequency band.

If the frequency band detected by the frequency detecting unit 350 is the third frequency band of 205 KHz to 300 MHz, the inductance varying unit 360 may turn on the first and second MEMS switches 366 and 367 through the power supply unit K, and may turn off the third MEMS switch 368. In other words, since the third frequency band is higher than the first frequency band and lower than the second frequency band, the inductance varying unit 360 may control the operation of each MEMS switch so that the inductance of the reception coil 310 has the value between L3 and L4.

Further, as the inductance of the reception coil 310 is changed to have the value between L3 and L4, the capacitance of the capacitor of the frequency matching unit 370 may be adjusted so that the frequency band of the wireless power receiver 300 is matched to the third frequency band.

Hereinafter, a method of controlling the wireless power receiver according to one embodiment will be described with reference to FIG. 15.

Hereinafter, the description of the method of controlling the wireless power receiver according to one embodiment will be made by making reference to the description of FIGS. 6 to 14.

FIG. 15 is a flowchart showing the method of controlling the wireless power receiver according to one embodiment.

First, the reception coil 310 of the wireless power receiver 300 wirelessly receives power from the wireless power transmitter 200 (step S101). According to one embodiment, the frequency band of the power received by the wireless power receiver 300 may be classified into two frequency bands. The first frequency band may be in the range of 110 KHz to 205 KHz, and the second frequency band may be 6.78 MHz.

The frequency detecting unit 350 of the wireless power receiver 300 detects the frequency band of the power transmitted from the wireless power transmitter 200 (step S103). According to one embodiment, the frequency detecting unit 350 may detect the frequency band of the power transmitted from the wireless power transmitter 200 through the in-band communication or the out-of-band communication.

The frequency detecting unit 350 of the wireless power receiver 300 determines if the detected frequency band is the first frequency band (step S105). In other words, the frequency detecting unit 350 may determine if the detected frequency band is the first frequency band or the second frequency band.

If the detected frequency band is the first frequency band, the inductance varying unit 360 of the wireless power receiver 300 increases the inductance of the reception coil 310 through the switching operation so that the reception coil 310 has proper inductance (step S107). Since the frequency band used based on electromagnetic induction is lower than the second frequency band, the inductance varying unit 360 may increase the inductance by lengthening the length of the reception coil 310 through the switching operation. Since the change of the inductance has been described with reference to FIGS. 8, 10, and 12, the details thereof will be omitted.

The frequency matching unit 370 of the wireless power receiver 300 matches the frequency of the wireless power receiver 300 to the first frequency band by combining the capacitance and the increased inductance of the reception coil 310 and transmits AC power having a frequency band matched to the first frequency band to the rectifying unit 330 (step S109).

The rectifying unit 330 of the wireless power receiver 300 rectifies the AC power in the matching state into DC power and transmits the DC power to the load 400 (step S111).

Meanwhile, if the detected frequency band is not determined as the first frequency band, the frequency detecting unit 350 determines the detected frequency band as the second frequency band (step S113).

The inductance varying unit 360 of the wireless power receiver 300 decreases the inductance of the reception coil 310 through the switching operation so that the reception coil 310 has proper inductance (step S115). Since the second frequency band is higher than the second frequency band, the inductance varying unit 360 may decrease the inductance by shortening the length of the reception coil 310 through the switching operation. Since the change of the inductance has been described with reference to FIGS. 9, 11, and 13, the details thereof will be omitted.

The frequency matching unit 370 of the wireless power receiver 300 matches the frequency of the wireless power receiver 300 to the second frequency band by combining the capacitance and the decreased inductance of the reception coil 310 and transmits AC power having a frequency band matched to the second frequency band to the rectifying unit 330 (step S117).

The rectifying unit 330 of the wireless power receiver 300 rectifies the AC power in the matching state into DC power and transmits the DC power to the load 400 (step S119).

FIG. 16 is a flowchart to explain a method of controlling the wireless power receiver according to another embodiment.

Hereinafter, the description of the method of controlling the wireless power receiver according to another embodiment will be made by making reference to the description of FIGS. 6 to 14.

The wireless power receiver 300 operates at the first frequency band (step S201). In other words, the inductance of the reception coil 310 may be set on the assumption that the frequency band of the power transmitted from the wireless power transmitter 200 is the first frequency band. In this case, the capacitance of the capacitor of the frequency matching unit 370 must be set according to the set inductance so that the frequency band of the wireless power receiver 300 is matched to the first frequency band.

According to one embodiment, the first frequency band may be in the range of 110 KHz to 205 KHz, but the embodiment is not limited thereto.

The reception coil 310 of the wireless power receiver 300 receives power having the first frequency band from the wireless power transmitter 200 (step S203). According to one embodiment, the reception coil 310 may wirelessly receive the power having the first frequency band through the electromagnetic induction from the second transmission coil 220 of the wireless power transmitter 200.

The frequency detecting unit 350 of the wireless power receiver 300 transmits a power signal to the wireless power transmitter 200 through in-band communication (step S205). The in-band communication scheme refers to a communication scheme to transmit information through a switch and a resistor by using the frequency band used in the wireless power transmission, and the details thereof has been described with reference to FIG. 5. The frequency detecting unit 350 may periodically transmit the power signal to the wireless power transmitter 200 through the in-band communication. According to one embodiment, the power signal may include one of a signal, which is transmitted by the wireless power receiver 300 in order to notify the wireless power transmitter 200 that the wireless power receiver 300 normally receives power, and a signal which is transmitted by the wireless power receiver 300 in order to request that the wireless power transmitter 200 increases or decreases power transmission.

The frequency detecting unit 350 of the wireless power receiver 300 periodically transmits the power signal to the wireless power transmitter 200 while determining if the wireless power receiver 300 has not received the power normally, that is, a power receiving state is abnormal (step S207).

According to one embodiment, the frequency detecting unit 350 determines that the wireless power receiver 300 has not received the power normally, that is, the power receiving state is abnormal in the procedure of transmitting the power signal to the wireless power receiver 300 three times. Otherwise, the frequency detecting unit 350 determines that the power receiving state is normal. In this case, the three-time transmission of the power signal is provided, but the embodiment is not limited thereto.

In addition, if the power receiving state is abnormal, the frequency band of the power transmitted from the wireless power transmitter 200 may not be the first frequency band.

If the frequency detecting unit 350 determines that the power receiving state is abnormal, the frequency detecting unit 350 of the wireless power receiver 300 activates the operation of the out-of-band communication module (step S209). According to one embodiment, the out-of-band communication module may be provided in the frequency detecting unit 350. According to one embodiment, the out-of-band communication module may employ a short-range communication scheme such as the Bluetooth, the ZigBee, the WLAN, and the NFC, but the embodiment is not limited thereto.

Meanwhile, if the frequency detecting unit 350 determines that the power receiving state is normal, the procedure returns to step S201.

The frequency detecting unit 350 of the wireless power receiver 300 determines that the frequency band of the power transmitted from the wireless power transmitter 200 is the second frequency band through the out-of-band communication module (step S211). In other words, the wireless power receiver 300 makes out-of-band communication with the wireless power transmitter 200 to determine if the frequency band of the power transmitted from the wireless power transmitter 200 is the second frequency band. According to one embodiment, the second frequency band may be 6.78 MHz, but the embodiment is not limited thereto.

If the frequency band of the power transmitted from the wireless power transmitter 200 is the second frequency band, the inductance varying unit 360 of the wireless power receiver 300 changes the inductance of the reception coil 310 to decrease the inductance of the reception coil 310 in order to match the frequency band of the wireless power receiver 300 to the second frequency band (step S213). Since the change of the inductance has been described with reference to FIGS. 9, 11, and 13, the details thereof will be omitted.

The frequency matching unit 370 of the wireless power receiver 300 more exactly matches the frequency band of the wireless power receiver 300 to the second frequency band through the capacitor as the inductance of the reception coil 310 is changed (step S215).

The rectifying unit 330 of the wireless power receiver 300 rectifies the AC power having a frequency band matched to the second frequency band into DC power and transmits the AC power to the load 400 (step S217).

Meanwhile, if the frequency detecting unit 350 determines that the frequency band of the power transmitted from the wireless power transmitter 200 is not the second frequency band, the frequency detecting unit 350 determines that the frequency band of the power transmitted from the wireless power transmitter 200 is the third frequency band (step S219). According to the embodiment, the third frequency band may be in the range of 206 KHz to 300 KHz, but the embodiment is not limited thereto.

The inductance varying unit 360 of the wireless power receiver 300 changes the inductance of the reception coil 310 to decrease the inductance of the reception coil 310 in order to match the frequency band of the wireless power receiver 300 to the third frequency band (step S221). In this case, the changed inductance of the reception coil 310 is smaller than the inductance in step S201 and greater than the inductance in step S213. Since the change of the inductance has been described with reference to FIGS. 9, 11, and 13, the details thereof will be omitted.

The frequency matching unit 370 of the wireless power receiver 300 more exactly matches the frequency band of the wireless power receiver 300 to the third frequency band through the capacitor as the inductance of the reception coil 310 is changed (step S223).

The rectifying unit 330 of the wireless power receiver 300 rectifies the AC power having a frequency band matched to the third frequency band into DC power and transmits the AC power to the load 400 (step S225).

The method of controlling the wireless power receiver according to the embodiment may be prepared as a program executable by a computer and stored in computer-readable recording media. The computer-readable recording media include a ROM, a RAM, a CD-ROM, a magnetic table, a floppy disk, and an optical data storing device, and include a device realized in the form of a carrier wave (for example, transmission over the Internet).

The computer-readable recording media are distributed into computer systems connected to each other through a network to store computer-readable codes through a distribution scheme so that the computer-readable codes may be executed. In addition, function programs, codes, and code segments used to realize the method can be easily deduced by programmers in the art to which the disclosure pertains.

Although a preferred embodiment of the disclosure has been described for illustrative purposes, those skilled in the art will appreciate that various modifications, additions and substitutions are possible, without departing from the scope and spirit of the invention as disclosed in the accompanying claims.

According to the embodiment, a scheme of transmitting power through electromagnetic induction may signify a tightly coupling scheme having a relatively low Q value, and a scheme of transmitting power through resonance may signify a loosely coupling scheme having a relatively high Q value.

The invention claimed is:

1. A wireless power receiver to wirelessly receive power from a wireless power transmitter, the wireless power receiver comprising:
   a reception coil to receive the power wirelessly transmitted from the wireless power transmitter through a magnetic field;
   a frequency detecting unit to detect a frequency band of the power transmitted from the wireless power transmitter;
   an inductance varying unit to change an inductance of the reception coil according to the detected frequency band; and
   a frequency matching unit to match a used frequency band of the wireless power receiver to the frequency band of the power transmitted from the wireless power transmitter according to the changed inductance of the reception coil,
   wherein the frequency band of the power transmitted from the wireless power transmitter comprises a first frequency band and a second frequency band, and the first frequency band is lower than the second frequency band,
   wherein the inductance varying unit comprises at least one switch and changes the used frequency band of the wireless power receiver by changing the inductance of the reception coil according to the frequency band transmitted from the wireless power transmitter through an operation of the at least one switch,
   wherein the at least one switch connects or disconnects one terminal of the reception coil to adjust a length of the reception coil, such that the inductance of the reception coil is changed,
   wherein the inductance varying unit controls an operation of the at least one switch so that a length of the reception coil is increased in order to increase the inductance of the reception coil,
   wherein the inductance varying unit controls the operation of the at least one switch so that the length of the reception coil is shortened in order to decrease the inductance of the reception coil, and
   wherein the frequency matching unit comprises a capacitor connected with the reception coil having the changed inductance.

2. The wireless power receiver of claim 1, wherein the frequency detecting unit detects the frequency band of the power transmitted from the wireless power transmitter by determining a power receiving state of the wireless power receiver through in-band communication.

3. The wireless power receiver of claim 2, wherein the frequency detecting unit determines the frequency band of the power transmitted from the wireless power transmitter through out-of-band communication if the power receiving state of the wireless power receiver is abnormal.

4. The wireless power receiver of claim 3, wherein the inductance varying unit decreases the inductance of the reception coil such that the used frequency band of the wireless power receiver is matched to the second frequency band if the frequency detecting unit determines that the frequency band of the power transmitted from the wireless power transmitter is the second frequency band.

5. The wireless power receiver of claim 4, wherein the frequency band of the power transmitted from the wireless power transmitter further comprises a third frequency band,
   the third frequency band is set between the first frequency band and the second frequency band, and
   the inductance varying unit changes the inductance of the reception coil so that the used frequency band of the wireless power receiver is matched to the third frequency band if the frequency detecting unit determines that the frequency band of the power transmitted from the wireless power transmitter is the third frequency band.

6. The wireless power receiver of claim 1, wherein the reception coil has a spiral structure in which one conductive line has a spiral shape on a flat surface.

7. The wireless power receiver of claim 1, wherein the at least one switch comprises a MEMS switch operating as power is applied thereto.

8. The wireless power receiver of claim 5, wherein the first frequency band is in a range of 110 KHz to 205 KHz, the second frequency band is 6.78 MHz, and the third frequency band is in a range of 206 KHz to 300 KHz.

9. The wireless power receiver of claim 1, wherein the reception coil has a helical structure in which one conductive line has a 3-D spiral shape.

10. A wireless power receiver to wirelessly receive power from a wireless power transmitter, the wireless power receiver comprises:
    a reception coil to receive power having a first frequency band from the wireless power transmitter;
    a frequency detecting unit to detect if a frequency band of the power transmitted from the wireless power transmitter is the first frequency band;
    an inductance varying unit to change an inductance of the reception coil if the detected frequency band is out of the first frequency band; and
    a frequency matching unit to match a used frequency band of the wireless power receiver to the frequency band of the power transmitted from the wireless power transmitter according to the changed inductance of the reception coil,
    wherein the frequency detecting unit determines the frequency band of the power transmitted from the wireless power transmitter as a second frequency band if the detected frequency band is out of the first frequency band, the inductance varying unit decreases the inductance of the reception coil such that the used frequency band of the wireless power receiver is matched to the second frequency band, and the first frequency band is lower than the second frequency band,
    wherein the inductance varying unit comprises at least one switch and changes the used frequency band of the wireless power receiver by changing the inductance of the reception coil according to the frequency band transmitted from the wireless power transmitter through an operation of the at least one switch,
    wherein the at least one switch connects or disconnects one terminal of the reception coil to adjust a length of the reception coil, such that the inductance of the reception coil is changed,
    wherein the inductance varying unit controls an operation of the at least one switch so that a length of the reception coil is increased in order to increase the inductance of the reception coil, wherein the inductance varying unit controls the operation of the at least one switch so that the length of the reception coil is shortened in order to decrease the inductance of the reception coil, and wherein the frequency matching unit comprises a capacitor connected with the reception coil having the changed inductance.

11. A wireless power receiver to wirelessly receive power from a wireless power transmitter, the wireless power receiver comprises:

a reception coil to receive power having a first frequency band from the wireless power transmitter;

a frequency detecting unit to detect if a frequency band of the power transmitted from the wireless power transmitter is the first frequency band;

an inductance varying unit to change an inductance of the reception coil if the detected frequency band is out of the first frequency band; and a frequency matching unit to match a used frequency band of the wireless power receiver to the frequency band of the power transmitted from the wireless power transmitter according to the changed inductance of the reception coil, wherein an outer diameter of the reception coil receiving power having the first frequency is 40 mm, wherein the frequency detecting unit deter tines the frequency band of the power transmitted from the wireless power transmitter as a second frequency band if the detected frequency band is out of the first frequency band, the inductance varying unit decreases the inductance of the reception coil such that the used frequency band of the wireless power receiver is matched to the second frequency band, and the first frequency band is lower than the second frequency band, wherein an outer diameter of the reception coil receiving power having the second frequency is 20 mm, wherein the inductance varying unit comprises at least one switch and changes the used frequency band of the wireless power receiver by changing the inductance of the reception coil according to the frequency band transmitted from the wireless power transmitter through an operation of the at least one switch, wherein the at least one switch connects or disconnects one terminal of the reception coil to adjust a length of the reception coil, such that the inductance of the reception coil is changed, wherein the inductance varying unit controls an operation of the at least one switch so that a length of the reception coil is increased in order to increase the inductance of the reception coil, wherein the inductance varying unit controls the operation of the at least one switch so that the length of the reception coil is shortened in order to decrease the inductance of the reception coil, and wherein the frequency matching unit comprises a capacitor connected with the reception coil having the changed inductance.

12. The wireless power receiver of claim 11, wherein the reception coil has a spiral structure in which one conductive line has a spiral shape on a flat surface.

13. The wireless power receiver of claim 11, wherein the frequency band of the power transmitted from the wireless power transmitter further comprises a third frequency band, the third frequency band is set between the first frequency band and the second frequency band, and the inductance varying unit changes the inductance of the reception coil so that the used frequency band of the wireless power receiver is matched to the third frequency band if the frequency detecting unit determines that the frequency band of the power transmitted from the wireless power transmitter is the third frequency band, wherein an outer diameter of the reception coil receiving power having the third frequency is 35 mm.

14. The wireless power receiver of claim 11, wherein the reception coil has a helical structure in which one conductive line has a 3-D spiral shape.

* * * * *